(12) United States Patent
Zhang et al.

(10) Patent No.: US 11,244,166 B2
(45) Date of Patent: Feb. 8, 2022

(54) INTELLIGENT PERFORMANCE RATING

(71) Applicant: INTERNATIONAL BUSINESS MACHINES CORPORATION, Armonk, NY (US)

(72) Inventors: Zhen Zhang, Beijing (CN); Xin Zheng, Beijing (CN); Hai He, Beijing (CN); Ji Dong Li, Beijing (CN); Xiaowan Lu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 229 days.

(21) Appl. No.: 16/684,703

(22) Filed: Nov. 15, 2019

(65) Prior Publication Data

US 2021/0150215 A1     May 20, 2021

(51) Int. Cl.
*G06K 9/00* (2006.01)
*G06N 20/00* (2019.01)
(Continued)

(52) U.S. Cl.
CPC ..... *G06K 9/00718* (2013.01); *G06K 9/00744* (2013.01); *G06K 9/00765* (2013.01);
(Continued)

(58) Field of Classification Search
CPC ........... G06K 9/00718; G06K 9/00765; G06K 9/00744; G06K 9/00711; G10L 15/26; G10L 25/63; G06N 20/00; G06N 5/04
See application file for complete search history.

(56) References Cited

U.S. PATENT DOCUMENTS 8,575,465 B2    11/2013   Rao et al.
9,040,799 B2    5/2015   Penttinen et al.
(Continued)

OTHER PUBLICATIONS

Mayor et al., "Performance Analysis and Scoring of the Singing Voice," AES 35th International Conference, Feb. 11-13, 2009, pp. 1-7.

(Continued)

*Primary Examiner* — Solomon G Bezuayehu
(74) *Attorney, Agent, or Firm* — Cantor Colburn LLP; Teddi Maranzano

(57) ABSTRACT

Aspects of the invention include receiving performance data comprising video data and audio data associated with a performance by a performer, wherein the video data comprises audience video data for the performance, determining a performer skill score based on a feature vector generated by a performance skill machine learning model, the feature vector comprising a plurality of features extracted from the performance data, parsing the performance data into a plurality of performance segments, analyzing the performance data to determine a performer emotion of the performer for each performance segment, determining an audience emotion based on the audience video data for one or more audience members for each of the performance segments, comparing the audience emotion to the performer emotion for each performance segment to determine an emotion accuracy score, and determining a final score for the performance based on the performer skill score and the emotion accuracy score.

20 Claims, 5 Drawing Sheets

(51) Int. Cl.
*G06N 5/04* (2006.01)
*G10L 25/63* (2013.01)
*G10L 15/26* (2006.01)

(52) U.S. Cl.
CPC .............. *G06N 5/04* (2013.01); *G06N 20/00* (2019.01); *G10L 15/26* (2013.01); *G10L 25/63* (2013.01)

(56) References Cited

U.S. PATENT DOCUMENTS

| | | | |
|---|---|---|---|
| 9,761,151 B2* | 9/2017 | Humphrey | G09B 19/0015 |
| 2004/0177744 A1 | 9/2004 | Strasser et al. | |
| 2010/0304811 A1* | 12/2010 | Schmidt | A63F 13/814 |
| | | | 463/7 |
| 2011/0146478 A1* | 6/2011 | Andrews | G10H 1/40 |
| | | | 84/611 |
| 2014/0007147 A1* | 1/2014 | Anderson | H04N 21/2665 |
| | | | 725/9 |
| 2017/0169727 A1* | 6/2017 | Briggs | G10L 25/63 |
| 2018/0137425 A1* | 5/2018 | D'Alo' | G06N 5/04 |
| 2019/0228365 A1* | 7/2019 | Kamath | G06Q 10/06393 |
| 2019/0318651 A1* | 10/2019 | Fenyvesi | G07C 1/28 |
| 2019/0383621 A1* | 12/2019 | Isaacs | G01C 21/3484 |
| 2020/0042925 A1* | 2/2020 | Ramani | G06F 9/542 |
| 2020/0202825 A1* | 6/2020 | Kolen | G06K 9/00355 |
| 2020/0359108 A1* | 11/2020 | Lee | H04H 60/65 |

OTHER PUBLICATIONS

Tsai et al., "Automatic Singing Performance Evaluation Using Accompanied Vocals as Reference Bases," Journal of Information Science and Engineering 31, 2015, pp. 821-838.

* cited by examiner

INTELLIGENT PERFORMANCE RATING

BACKGROUND

The present invention generally relates to evaluation and rating of performances and more specifically, to an intelligent performance rating method and system.

Live musical competitions have become increasingly popular. Typically, in these competitions, there are a group of judges that evaluate the performance and provide ratings for the singers and musicians. With the advent of online and streaming video technology, singers and musicians have sought wide spread appeal by providing online access to individuals for their different performances. These online musical performances can be either pre-recorded or an actual live performance. For the online musical performances, there are typically no judges that are evaluating and rating these performers. Instead, online users are providing a variety of feedback to the performers such as, for example, likes, ratings, and comments.

SUMMARY

Embodiments of the present invention are directed to a computer-implemented method for performance rating. A non-limiting example computer-implemented method includes receiving performance data comprising video data and audio data associated with a performance by a performer, wherein the video data comprises audience video data for the performance, determining a performer skill score based on a feature vector generated by a performance skill machine learning model, the feature vector comprising a plurality of features extracted from the performance data, parsing the performance data into a plurality of performance segments, analyzing the performance data to determine a performer emotion of the performer for each segment in the plurality of performance segments, determining an audience emotion based on the audience video data for one or more audience members for each of the performance segments in the plurality of performance segments, comparing the audience emotion to the performer emotion for each performance segment in the plurality of performance segments to determine an emotion accuracy score, and determining a final score for the performance based at least in part on the performer skill score and the emotion accuracy score.

Embodiments of the present invention are directed to a system for performance rating. A non-limiting example of the system includes a processor communicatively coupled to a memory, the processor configured to perform receiving performance data comprising video data and audio data associated with a performance by a performer, wherein the video data comprises audience video data for the performance, determining a performer skill score based on a feature vector generated by a performance skill machine learning model, the feature vector comprising a plurality of features extracted from the performance data, parsing the performance data into a plurality of performance segments, analyzing the performance data to determine a performer emotion of the performer for each segment in the plurality of performance segments, determining an audience emotion based on the audience video data for one or more audience members for each of the performance segments in the plurality of performance segments, comparing the audience emotion to the performer emotion for each performance segment in the plurality of performance segments to determine an emotion accuracy score, and determining a final score for the performance based at least in part on the performer skill score and the emotion accuracy score.

Embodiments of the invention are directed to a computer program product for performance rating, the computer program product comprising a computer readable storage medium having program instructions embodied therewith. The program instructions are executable by a processor to cause the processor to perform a method. A non-limiting example of the method includes receiving performance data comprising video data and audio data associated with a performance by a performer, wherein the video data comprises audience video data for the performance, determining a performer skill score based on a feature vector generated by a performance skill machine learning model, the feature vector comprising a plurality of features extracted from the performance data, parsing the performance data into a plurality of performance segments, analyzing the performance data to determine a performer emotion of the performer for each segment in the plurality of performance segments, determining an audience emotion based on the audience video data for one or more audience members for each of the performance segments in the plurality of performance segments, comparing the audience emotion to the performer emotion for each performance segment in the plurality of performance segments to determine an emotion accuracy score, and determining a final score for the performance based at least in part on the performer skill score and the emotion accuracy score.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
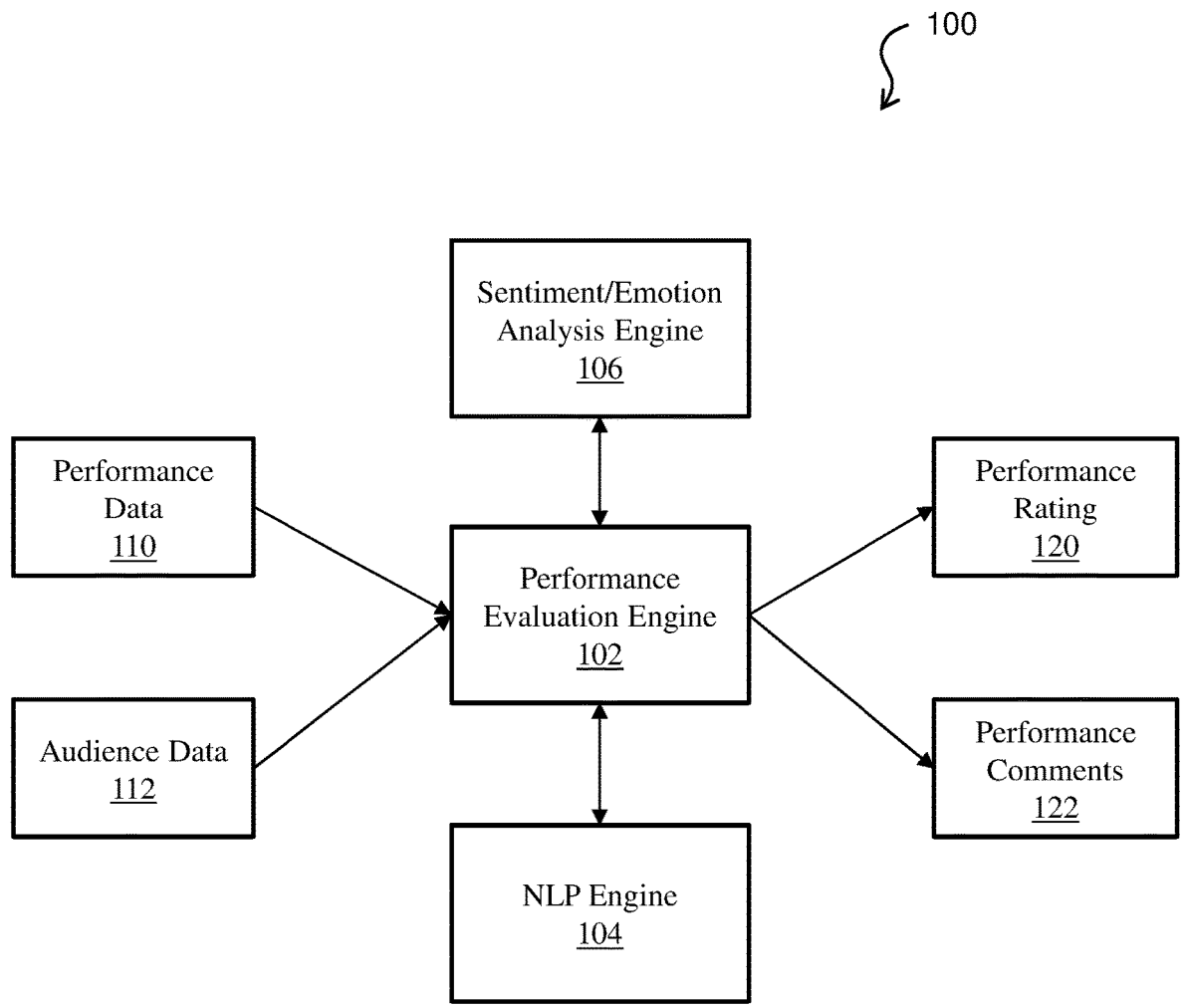
FIG. 1 illustrates a block diagram of a system for performance rating in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As described above, most musical competitions are rated and evaluated by musical experts that utilize a scoring system based on the experts' prior musical experience and expertise. However, ratings made by human experts tend to be affected by others around them as well as the environment of the musical performance. For example, if several members of an audience are cheering in response to the performance, this environmental factor may influence the experts' ratings of the performance. Technological techniques could be utilized to analyze and rate a musical performer's singing and proficiency with one or more instruments; however, these are very limited in that they focus on just the technical aspects of a singer, for example, and not on the effectiveness of the total performance (e.g., presentation, audience reaction, etc.).

One or more embodiments of the present invention address one or more of the shortcomings of the prior art by providing for performance rating, evaluations, and feedback that allow an online performance to be reviewed based on a variety of factors. That is to say, aspects of the present invention provide for an intelligent method to rate a live performance and provide comments/feedback on the performance in a comprehensive manner. This performance rating method and system provides a user behavior based live evaluation module that first analyzes the majority of an audience viewing behavior towards each frame of the online performance based on a trained machine learning model. The model then predicts and tags each frame of the live performance. An overall rating of the live show video can be automatically provided based on each tag associated with a frame in the video by the trained machine learning model. In addition, an emotion evaluation module can be utilized to analyze the relationship between an audience member's emotion and the music based on the song style (e.g., love song, dance song, etc.). The trained machine learning model can determine whether a current emotion of an audience member (user) matches the emotion of the song at the time. This determination can be utilized in the rating or scoring process to determine the effectiveness of the performance to illicit a desired emotion from users.

In one or more embodiments of the present invention, the trained machine learning model can be utilized to analyze existing videos that have already been evaluated by experts or judged and gather the comments from these judges to then tag the comments to parts of the performance. A feature vector can be generated to include a variety of features including, but not limited, data from the comments as well as performer skill features (e.g., ratings for timber, tune, lyrics, etc.). The feature vector can be utilized to output word embeddings for comments that are generated by the trained machine learning model. The output is these generated comments that provide evaluation and feedback for the live performance. For example, if in a previous performance, a performer had utilized a certain type of pitch incorrectly, the comments by the judges related to the pitch of the performer's voice can be utilized to then generate similar comments for the current performer's utilization of a certain type of pitch.

In one or more embodiments of the invention, the audience members for the live performance can have wearable devices (sensors) or other user devices that are configured to collect physiological data for each of the audience members. This physiological data can be compared to other physiological data that can be taken to online viewers/listeners of the performance to calculate a similarity value that represents a matching of the emotion of the singers and the song with the audience members, both present and online. Based on the above mentioned scoring metrics, a final score can be generated as well as personalized comments for the performance.

Turning now to a more detailed description of aspects of the present invention, FIG. 1 depicts a system for performance ratings according to embodiments of the invention. The system 100 includes a performance evaluation engine 102, a natural language processing (NLP) engine 104, and a sentiment/emotion analysis engine 106. In one or more embodiments of the invention, the performance evaluation engine 102 is configured to determine and evaluate a skill level of a performer during a performance. In addition, the performance evaluation engine 102 can evaluate a behavior of one or more users of the system by, for example, analyzing user behavior while watching the performance online (e.g., fast forwarding, pausing, reversing, etc. of video frames of the performance). In some embodiments of the invention, the user behavior can be utilized to train the performance evaluation engine 102 to assist with predicting user behavior towards other performances and predict how the user may rate the performance. Also, the sentiment/emotion analysis engine 106 can determine an emotion of a performer, a user, or an audience member during the performance. The emotions can be associated with the video frames or the musical notes in the performance. In one or more embodiments of the invention, the skill level of a performer can be determine based on a variety of factors related to the performer's singing and proficiency with certain musical instruments. For singing evaluations of a performer, factors include, but are not limited to, timbre, tempo, pitch, tune, intonation, volume, lyrics, and other parameters of musical performance. Likewise, proficiency with musical instruments can utilize some of the same factors and include, but is not limited to, tempo, timing, pitch, dynamics, and timbre. These factors can include an associated rating that can be utilized in a feature vector generated by a machine learning model. Performer skill performance evaluation can be done utilizing a convolutional neural network (CNN) to identify and captured the details and objects of a performers from split video frames. The evaluation model analysis and extraction from the synchronized video voice comments can be effectuated using methods such as, for example, Word2vec. And an evaluation model can use an LSTM (Long Short-Term Memory) module and a BLEU (Bilingual Evaluation understudy) to calculate and connect the performers performance detail vectors with synchronized comments words to train out the module.

In one or more embodiments of the invention, the performance evaluation rating described herein can be utilized to generate a final score for the performance. In addition to the performance evaluation rating, other ratings can be included when determining the final rating for the performance. In one or more embodiments of the invention, the performance evaluation engine 102 can analyze audience data 112 taken from video and audio associated with one or more audience members that are in attendance at the live performance. The sentiment/emotion analysis engine 106 can determine an emotion for each audience member. In addition, the sentiment/emotion analysis engine 106 can also determine the emotion of the performer during the performance and associate the emotion with different parsed segments of the performance. For example, a performance may begin with a slow building tempo which could indicate a sad emotion and then change to more fast tempo which could indicate a happy emotion. Video of the performance can be segmented such that the beginning of the performance is tagged with a sad emotion and later segments could be tagged with happier emotions based on the performance. The performers emotion during different segments of the performance can be compared to the audience members' emotion during the same segments to determine if the emotions are a match or if they are similar. This emotion comparison can determine an emotion accuracy score or rating that can be utilized to determine the final rating for the performance.

In one or more embodiments of the invention, an online user that is viewing a recording of the performance can take certain actions while viewing the performance such as, for example, fast-forwarding, rewinding, pausing, and the like. The user actions can be associated with certain segments of the video and utilized to determine different user action scoring for the different segments of the performance. For example, if a user fast-forwards through a first segment of the performance, the user action is indicative of the user not liking the first segment of the performance. Whereas, if the user continues to rewind other segments and re-watch these segments, then this indicates that the user likes the other segments. A user score for performance can be determined based on the user actions taken while the performance is being viewed. This user score can be utilized when determining the final performance rating 120. To develop a scoring model leveraging historical ratings for performance videos and a user's corresponding watching actions (e.g., fast forward, rewind, pause, etc.), firstly, the performance evaluation engine 102 analyzes the audience retention curve for each video, and recognize the user's watching actions (e.g., fast forward, rewind, pause, etc.) per a group of frames according to the retention curve pattern. Secondly, the system 100 can transfer the categorical watching action tags into numeric form by one-hot encoding. Finally, with the one-hot encoded action tags, duration per frames grouped under a user action tag and the history rating to performance video, the performance evaluation engine 102 can apply logistic regression to train a model to predict an online user's rating to a live performance based on his/her instant watching actions as mentioned above.

In one or more embodiments of the invention, the performance evaluation engine 102 can utilize a machine learning model to generate personalized comments for a musical performance. The machine learning model can be trained utilizing historical data associated with past musical performance competitions where performers are performing in front of one or more judges. Based on the comments made by the one or more judges, the machine learning can be trained to associate certain word embeddings with performance types, skills, and the like. When the performance data 110 is inputted into the performance evaluation engine 102, the performance evaluation engine 102 can generate these performance comments 122 by utilize similar or the same word embeddings with the current performance. The performance evaluation engine 102 can first separate historical performance videos into two parts: performance(video) and comments(voice). For a performance video, the performance evaluation engine 102 can split the video into frames. For the voice comments, performance evaluation engine 102 first uses voice-to-text technology to convert the voice script into text. And then, performance evaluation engine 102 can separate the text into word embedding sequences. As video frames and word embeddings are both vector sequences, the performance evaluation engine 102 can use them to train an RNN/LSTM/GRU model. The trained model is used to make new comments to real-time performances, performance evaluation engine 102 can then split live performances into video frames and use video frames and the trained model as input. The trained model will generate text comments based on the performance. Finally, performance evaluation engine 102 uses text-to-voice technology to transform text comments into voice comments for the performance.

In one or more embodiments of the invention, the performance evaluation engine 102 analyzes, using a trained machine learning model, the performance data 110 input (e.g., speech, text, video data, etc.) using sentiment, tonal analysis to identify emotions and sentiment for each part of the performance. The performance evaluation engine 102 and the NLP engine 104 can perform natural language processing (NLP) analysis techniques on audio data taken from the performance data 110 associated with the live performance. NLP is utilized to derive meaning from natural language. A speech to text (STT) module can translate the audio data to text for processing by the performance evaluation engine 102. The performance evaluation engine 102 can analyze the audio by parsing, syntactical analysis, morphological analysis, and other processes including statistical modeling and statistical analysis. The type of NLP analysis can vary by language and other considerations. The NLP analysis is utilized to generate a first set of NLP structures and/or features which can be utilized by a computer to identify and generate certain keywords indicative of a mood or sentiment of the performance. These NLP structures include a translation and/or interpretation of the natural language input, including synonymous variants thereof.

The sentiment/emotion analysis engine 106 can be utilized by the performance evaluation engine 102 to determine a sentiment from audio/textual data. In one or more embodiments of the invention, the audience data 112 can include text from comments that have been associated with or posted to the online performance video or audio comments made by judges during the performance. Any cognitive AI can be utilized within the sentiment/emotion analysis engine 106. The sentiment/emotion analysis engine 106 can process natural language to incorporate both a linguistic and statistical analysis in evaluating the context of a communication. In text analysis, the sentiment is the attitude or opinion expressed toward something. Sentiment can be positive, "sounds good", negative, "this is bad", or neutral. Sentiment can be calculated based on keywords extracted and evaluated at a keyword level. Additionally, the sentiment analysis may be capable of identifying negations, such as the term "not" and the change in sentiment from the keyword "good" when the phrase is "not" "good". The sentiment analysis may consider intensity when the terms "very" or other adjectives are utilized in combination with a keyword. Additionally, the keywords may be weighted. For instance, a positive phrase such as "like" will have a predefined positive weight, whereas the phrase "love" might have a higher predefined positive weight. Additionally, negative weights may be afforded negative phrases such as "dislike" would have a predefined negative weight and the phrase "hate" might have a higher negative weight. The sentiment/emotion analysis engine 106 can evaluate the content to provide a sentiment level. This sentiment level may also include an intensity value.

The sentiment/emotion analysis engine 106 can use linguistic analysis to detect three types of tones from the text.

The natural language content is analyzed by the sentiment/emotion analysis engine 106 for determining the emotional impact, social tone, and writing style that the comment projects. The sentiment/emotion analysis engine 106 may provide tonal scores for emotional tone, social tone, and language tone. For emotional tone, the tonal analysis module may utilize the emotions for "joy", "fear", "sadness", "disgust" and "anger". Each natural language element is evaluated with respect to each emotion. Each emotion may be evaluated from lower values having a value range that indicates if that emotion is less likely to appear as perceived or alternatively to a higher value range if the emotion is more likely to be perceived with respect to each natural language content. Other emotions may be utilized as well as a different value score.

In one or more embodiments, audio and text data can be analyzed by the performance evaluation engine 102 to identify and determine emotion or ratings for the performance. In addition, certain keywords can be analyzed to trigger an analysis such as jargon terms associated with the musical performances. For example, musical performances can have certain terms added to a jargon lexicon to assist with evaluating the performance and/or the emotion of the commenter. The keywords can be extracted from audio of users/judges, etc. and/or from comments associated with the online performance.

In embodiments of the invention, the engines 102, 104, 106 can also be implemented as so-called classifiers (described in more detail below). In one or more embodiments of the invention, the features of the various engines/classifiers (102, 104, 106) described herein can be implemented on the processing system 500 shown in FIG. 5, or can be implemented on a neural network (not shown). In embodiments of the invention, the features of the engines/classifiers 102, 104, 106 can be implemented by configuring and arranging the processing system 100 to execute machine learning (ML) algorithms. In general, machine learning (ML) algorithms, in effect, extract features from received data (e.g., inputs to the engines 102, 104, 106) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 102, 104, 106 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In embodiments of the invention where the engines/classifiers 102, 104, 106 are implemented as neural networks, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. In the descriptions here, any functionality ascribed to the system 100 can be implemented using the processing system 500 applies.

In one or more embodiments of the invention, the cloud computing system 50 (shown in FIGS. 3 and 4) can be in wired or wireless electronic communication with one or all of the elements of the system 100. Cloud 50 can supplement, support or replace some or all of the functionality of the elements of the system 100. Additionally, some or all of the functionality of the elements of system 100 can be implemented as a node 10 (shown in FIGS. 3 and 4) of cloud 50. Cloud computing node 10 is only one example of a suitable cloud computing node and is not intended to suggest any limitation as to the scope of use or functionality of embodiments of the invention described herein.

Figure 2:
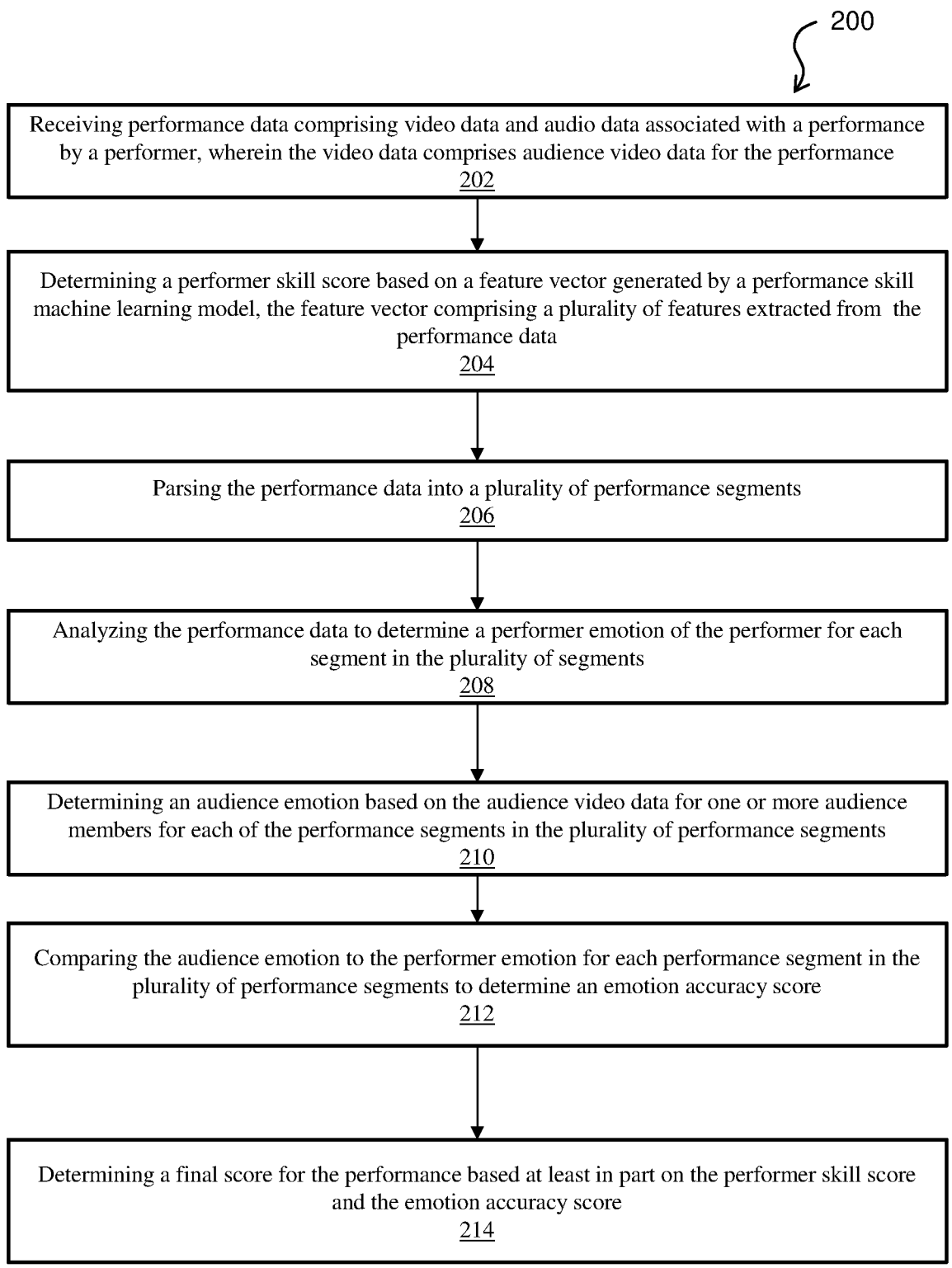
FIG. 2 illustrates a flow diagram of a method for performance rating in accordance with one or more embodiments of the present invention.

FIG. 2 depicts a flow diagram of a method for intelligent performance rating according to one or more embodiments of the invention. The method 200 includes receiving performance data comprising video data and audio data associated with a performance by a performer, wherein the video data comprises audience video data for the performance, as shown in block 202. At block 204, the method 200 includes determining a performer skill score based on a feature vector generated by a performance skill machine learning model, the feature vector comprising a plurality of features extracted from the performance data. The performer skill can be determined by a variety of trained machine learning models that are trained utilized supervised or unsupervised learning techniques. Features extracted can include, but are not limited to, tempo, timbre, pitch, volume, and other analytics associated with musical performances. The method 200 continues at block 206 to include parsing the performance data into a plurality of performance segments. And at block 208, the method 200 includes analyzing the performance data to determine a performer emotion of the performer for each segment in the plurality of segments. The method 200, at block 210, includes determining an audience emotion based on the audience video data for one or more audience members for each of the performance segments in the plurality of performance segments. The method 200 also includes comparing the audience emotion to the performer emotion for each performance segment in the plurality of performance segments to determine an emotion accuracy score, as shown in block 212. And at block 214, the method 200 includes determining a final score for the performance based at least in part on the performer skill score and the emotion accuracy score.

Additional processes may also be included. It should be understood that the processes depicted in FIG. 2 represent illustrations, and that other processes may be added or existing processes may be removed, modified, or rearranged without departing from the scope and spirit of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
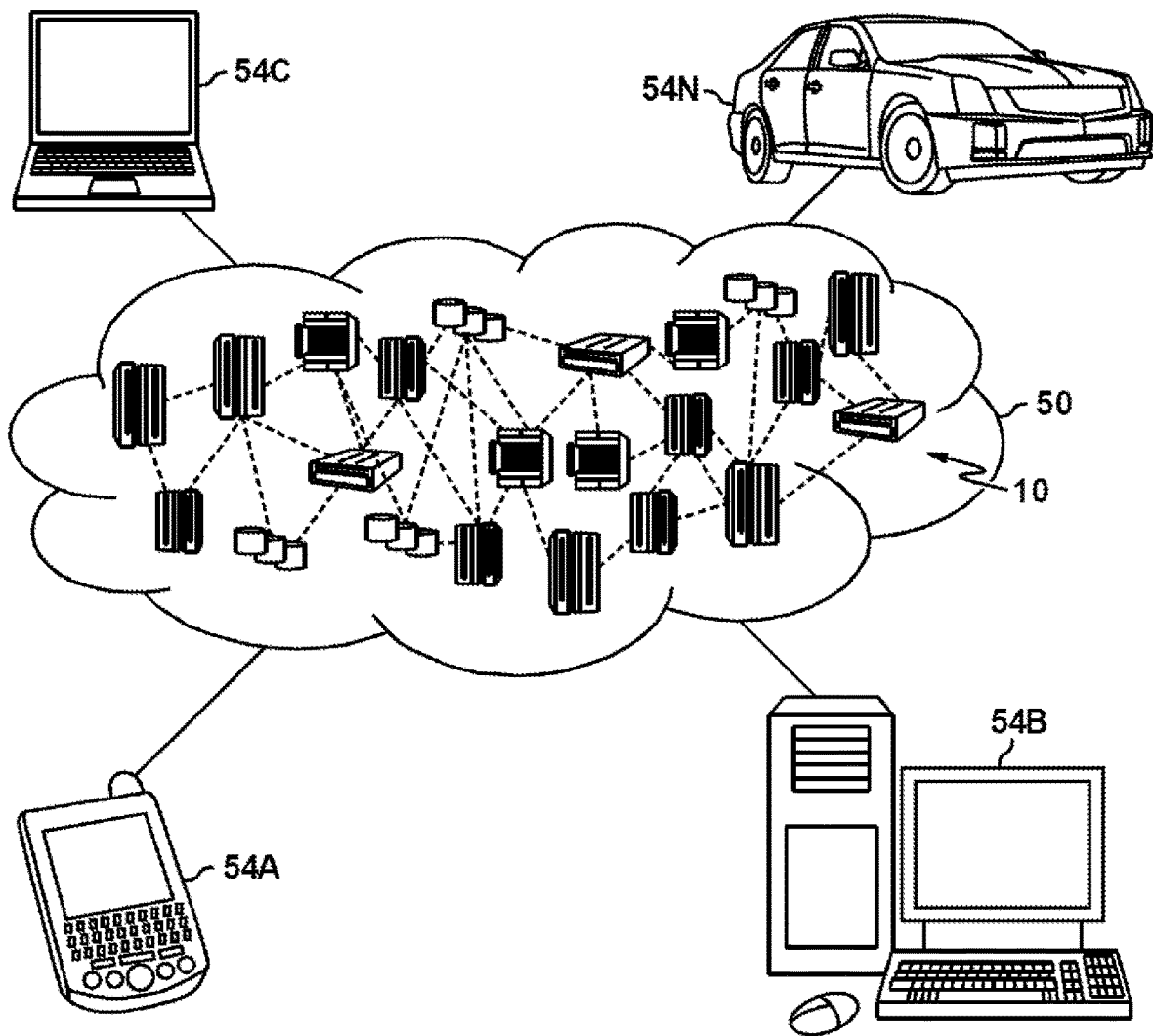
FIG. 3 depicts a cloud computing environment according to one or more embodiments of the present invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
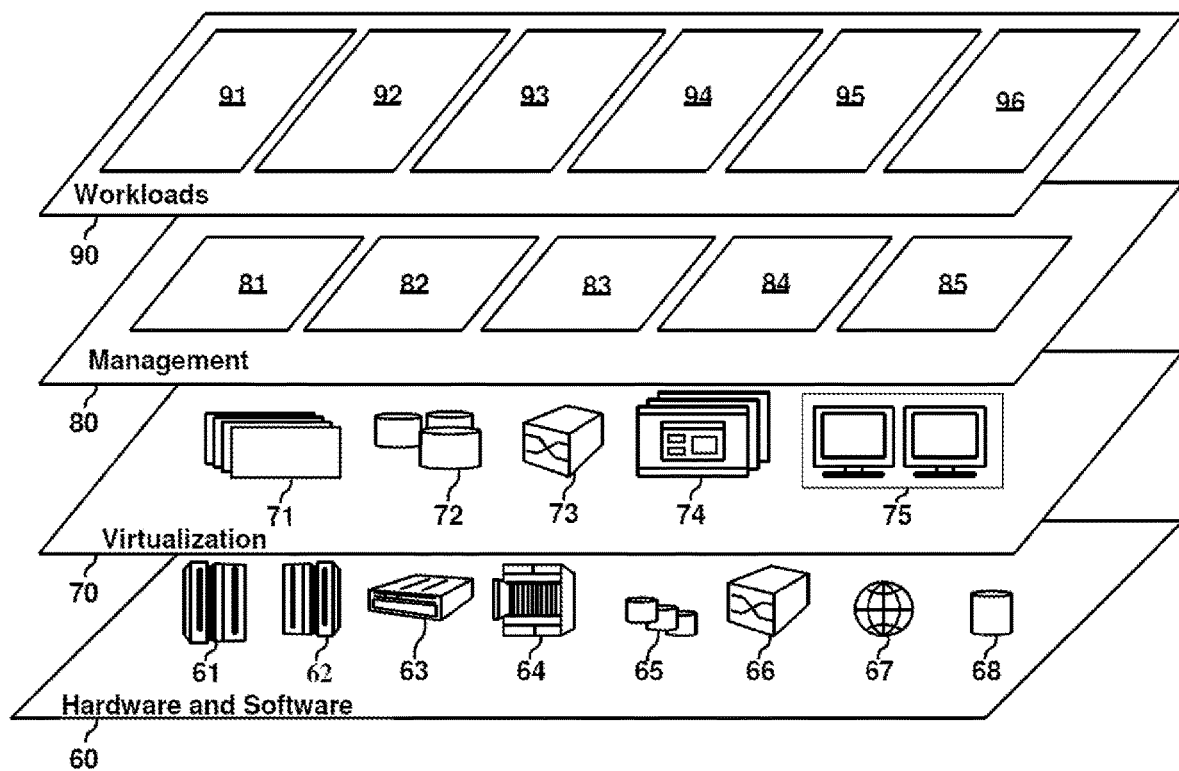
FIG. 4 depicts abstraction model layers according to one or more embodiments of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performance rating 96.

Figure 5:
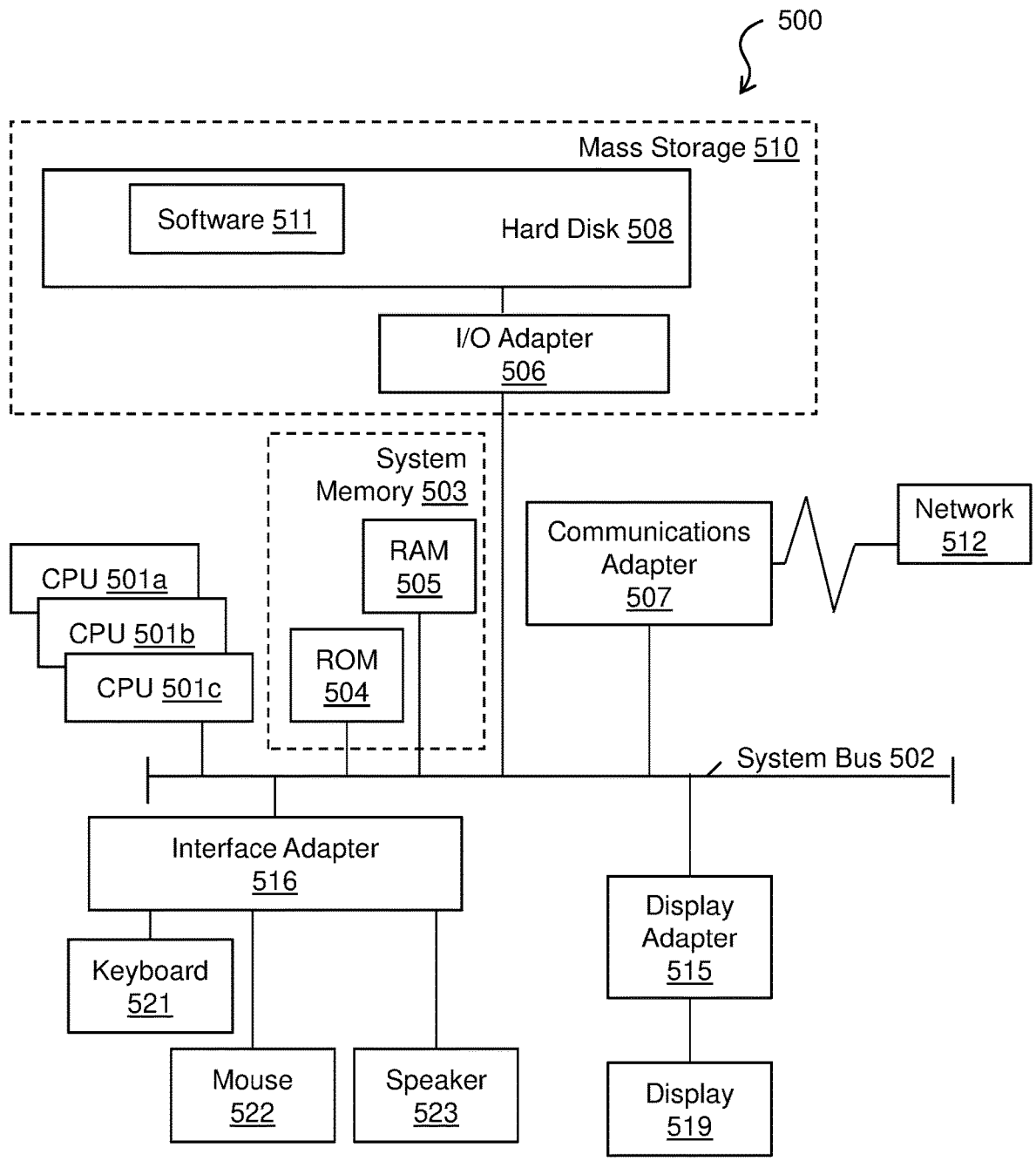
FIG. 5 depicts a block diagram of a computer system for use in implementing one or more embodiments of the present invention.

Turning now to FIG. 5, a computer system 500 is generally shown in accordance with an embodiment. The computer system 500 can be an electronic, computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 may be, for example, a server, desktop computer, laptop computer, tablet computer, or smartphone. In some examples, computer system 500 may be a cloud computing node. Computer system 500 may be described in the general context of computer system executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 500 has one or more central processing units (CPU(s)) 501*a*, 501*b*, 501*c*, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include a read only memory (ROM) 504 and a random access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read only memory, flash memory, or any other suitable memory systems.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described herein below with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one embodiment, a portion of the system memory 503 and the mass storage 510 collectively store an operating system, which may be any appropriate operating system, such as the z/OS or AIX operating system from IBM Corporation, to coordinate the functions of the various components shown in FIG. 5.

Additional input/output devices are shown as connected to the system bus 502 via a display adapter 515 and an interface adapter 516 and. In one embodiment, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by a display adapter 515, which may include a graphics controller to improve the performance of graphics intensive applications and a video controller. A keyboard 521, a mouse 522, a speaker 523, etc. can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 501, and, storage capability including the system memory 503 and the mass storage 510, input means such as the keyboard 521 and the mouse 522, and output capability including the speaker 523 and the display 519.

In some embodiments, the communications adapter 507 can transmit data using any suitable interface or protocol, such as the internet small computer system interface, among others. The network 512 may be a cellular network, a radio network, a wide area network (WAN), a local area network (LAN), or the Internet, among others. An external computing device may connect to the computer system 500 through the network 512. In some examples, an external computing device may be an external webserver or a cloud computing node.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

What is claimed is:

1. A computer-implemented method for performance rating, the method comprising:
- receiving performance data comprising video data and audio data associated with a performance by a performer, wherein the video data comprises audience video data for the performance;
- determining a performer skill score based on a feature vector generated by a performance skill machine learning model, the feature vector comprising a plurality of features extracted from the performance data;
- parsing the performance data into a plurality of performance segments;
- analyzing the performance data to determine a performer emotion of the performer for each performance segment in the plurality of performance segments;
- determining an audience emotion based on the audience video data for one or more audience members for each of the performance segments in the plurality of performance segments;
- comparing the audience emotion to the performer emotion for each performance segment in the plurality of performance segments to determine an emotion accuracy score; and
- determining a final score for the performance based at least in part on the performer skill score and the emotion accuracy score.

2. The computer-implemented method of claim 1, further comprising:
- receiving historical performance data associated with a historical performance, the historical performance data comprises historical comment audio data comprising one or more historical comments made by one or more judges associated with the historical performance,
- wherein the historical performance is associated with the performance; and
- converting the historical comment audio data to textual data;
- analyzing the textual data to train a machine learning model; and
- generating, by the machine learning model, one or more comments for the performance based on the one or more historical comments for the historical performance.

3. The computer-implemented method of claim 1, wherein the audience emotion is further determined based on physiological data obtained by one or more sensors associated with each of the one or more audience members.

4. The computer-implemented method of claim 1, wherein the performance data further comprises online user data; and the method further comprises:
- determining one or more user actions taken by a user during viewing the performance; and
- determining a user score for the performance based on the one or more user actions.

5. The computer-implemented method of claim 4, wherein the final score for the performance is further based on the user score for the performance.

6. The computer-implemented method of claim 4, wherein the one or more user actions comprises one or more of a fast-forwarding, a pausing, and a rewinding of the performance by the user.

7. The computer-implemented method of claim 1, wherein the plurality of features comprises one or more of timing, pitch, intonation, volume, and timber of the performance.

8. A system comprising:
- a memory having computer readable instructions; and
- one or more processors for executing the computer readable instructions, the computer readable instructions controlling the one or more processors to perform operations comprising:
  - receiving performance data comprising video data and audio data associated with a performance by a performer, wherein the video data comprises audience video data for the performance;
  - determining a performer skill score based on a feature vector generated by a performance skill machine learning model, the feature vector comprising a plurality of features extracted from the performance data;
  - parsing the performance data into a plurality of performance segments;
  - analyzing the performance data to determine a performer emotion of the performer for each performance segment in the plurality of performance segments;
  - determining an audience emotion based on the audience video data for one or more audience members for each of the performance segments in the plurality of performance segments;
  - comparing the audience emotion to the performer emotion for each performance segment in the plurality of performance segments to determine an emotion accuracy score; and
  - determining a final score for the performance based at least in part on the performer skill score and the emotion accuracy score.

9. The system of claim 8, further comprising:
- receiving historical performance data associated with a historical performance, the historical performance data comprises historical comment audio data comprising one or more historical comments made by one or more judges associated with the historical performance; and
- wherein the historical performance is associated with the performance;
- converting the historical comment audio data to textual data;
- analyzing the textual data to train a machine learning model; and
- generating, by the machine learning model, one or more comments for the performance based on the one or more historical comments for the historical performance.

10. The system of claim 8, wherein the audience emotion is further determined based on physiological data obtained by one or more sensors associated with each of the one or more audience members.

11. The system of claim 8, wherein the performance data further comprises online user data; and the method further comprises:
- determining one or more user actions taken by a user during viewing the performance; and
- determining a user score for the performance based on the one or more user actions.

12. The system of claim 11, wherein the final score for the performance is further based on the user score for the performance.

13. The system of claim 11, wherein the one or more user actions comprises one or more of a fast-forwarding, a pausing, and a rewinding of the performance by the user.

14. A computer program product comprising a non-transitory computer readable storage medium having program instructions embodied therewith, the program instructions executable by a processor to cause the processor to perform operations comprising:

receiving performance data comprising video data and audio data associated with a performance by a performer, wherein the video data comprises audience video data for the performance;

determining a performer skill score based on a feature vector generated by a performance skill machine learning model, the feature vector comprising a plurality of features extracted from the performance data;

parsing the performance data into a plurality of performance segments;

analyzing the performance data to determine a performer emotion of the performer for each performance segment in the plurality of performance segments;

determining an audience emotion based on the audience video data for one or more audience members for each of the performance segments in the plurality of performance segments;

comparing the audience emotion to the performer emotion for each performance segment in the plurality of performance segments to determine an emotion accuracy score; and determining a final score for the performance based at least in part on the performer skill score and the emotion accuracy score.

15. The computer program product of claim 14, further comprising:

receiving historical performance data associated with a historical performance, the historical performance data comprises historical comment audio data comprising one or more historical comments made by one or more judges associated with the historical performance; and wherein the historical performance is associated with the performance;

converting the historical comment audio data to textual data;

analyzing the textual data to train a machine learning model; and generating, by the machine learning model, one or more comments for the performance based on the one or more historical comments for the historical performance.

16. The computer program product of claim 14, wherein the audience emotion is further determined based on physiological data obtained by one or more sensors associated with each of the one or more audience members.

17. The computer program product of claim 14, wherein the performance data further comprises online user data; and the method further comprises:

determining one or more user actions taken by a user during viewing the performance; and determining a user score for the performance based on the one or more user actions.

18. The computer program product of claim 17, wherein the final score for the performance is further based on the user score for the performance.

19. The computer program product of claim 17, wherein the one or more user actions comprises one or more of a fast-forwarding, a pausing, and a rewinding of the performance by the user.

20. The computer program product of claim 14, wherein the plurality of features comprises one or more of timing, pitch, intonation, volume, and timber of the performance.

* * * * *